United States Patent [19]
Chapman

[11] 3,907,079
[45] Sept. 23, 1975

[54] VISCOUS FLUID DAMPER

[75] Inventor: Arthur S. Chapman, Rancho Palos Verdes, Calif.

[73] Assignee: Hughes Aircraft Company, Culver City, Calif.

[22] Filed: Oct. 31, 1973

[21] Appl. No.: 411,508

[52] U.S. Cl. ............... 188/290; 188/268; 192/58 B
[51] Int. Cl.² .......................................... F16D 57/02
[58] Field of Search ........... 188/290, 296, 268, 316, 188/288; 192/58 R, 58 B, 58 C, 58 A; 73/134

[56] References Cited
UNITED STATES PATENTS

| | | | |
|---|---|---|---|
| 2,895,580 | 7/1959 | Badin | 192/58 A |
| 3,385,408 | 5/1968 | Manning | 188/290 X |
| 3,400,796 | 9/1968 | Savins et al. | 192/58 C |

FOREIGN PATENTS OR APPLICATIONS

| | | | |
|---|---|---|---|
| 313,483 | 7/1919 | Germany | 188/290 |
| 724,846 | 2/1955 | United Kingdom | 188/290 |

OTHER PUBLICATIONS
Spooner, L. W., *Silicone Putty As An Engineering Material,* Product Engineering, Jan. 1950, pp. 90–93.

*Primary Examiner*—George E. A. Halvosa
*Attorney, Agent, or Firm*—Richard J. Rengel; W. H. MacAllister

[57] ABSTRACT

A fluid damper including a stator and rotor has a plurality of individual annular areas of different concurrent shear rates. The different annular areas of a disc are used in combination to control the characteristic of the damper to provide substantial nonlinearity in the damping coefficient of a high viscosity, silicone damping fluid, i.e., decreasing apparent viscosity with increasing shear rate.

An annular area of large diameter provides high shear rates in the fluid in a small gap spacing to produce the nonlinearity in the damper characteristic. A small annular area is the location of small diameter seals for minimum break-away friction. A large gap spacing minimizes shear resistance in the small annular area of low angular velocity having approximately a linear damping characteristic. The resultant damping characteristic of the combination retains substantial nonlinearity for effectively limiting the torque requirements at high shear rates.

14 Claims, 4 Drawing Figures

VISCOUS FLUID DAMPER

The invention herein described was made in the course of or under a contract with the United States Army.

CROSS-REFERENCE TO RELATED COPENDING APPLICATION

Ser. No. 274,528, filed July 24, 1972, for "Highly Viscous Fluid Damper Providing Regulated Non-Linear Damping for Traversing Units," H. P. Higginson et al. and common assignee.

BACKGROUND OF THE INVENTION

In various equipment requiring sighting of objects, substantial damping is required to eliminate waver and overshoot and thereby maintain the equipment sighted directly on target or other object. In weapon systems, such as a portable missile launcher having controlled guidance, optical tracking of the target is provided for throughout the flight of the missile. Accordingly, it is important to regulate sighting and tracking movements to eliminate waver of a human operator, for example, in order to maintain a true flight path throughout the flight of the missile. Damping in both azimuth and elevation axes of traversing units of weapon systems including guidance designator stations and other equipment, such as television and motion picture cameras, eliminates waver during tracking and aiming. In guided missile systems, however, it is more important to avoid transmission of, and response to, control signals due to waver to eliminate resulting deviations in the missile flight path, particularly near the time of impact when deviations due to waver can direct the missile past the target. For example, guidance control signals in response to the waver of a human operator, typically 0.6 cycle per second, is capable of causing deviation in the flight of the missile being guided such that a moving vehicle at a distance of only 50 feet could not be accurately tracked to score a hit; or a stationary target could not be hit at a distance of only 1,000 yards.

While substantial damping at low traverse rates has been found to be necessary for sighting of this type of equipment, the system is encumbered by an increasing high resistance to motion so as to effectively limit the traverse rates. During target acquisition, when rapid slewing about either or both axes is either desirable or required in operation, the damping system must be disengaged or an override provided to limit linearly increasing resistance of fluid medium dampers (Newtonian) and the torque required at the higher traverse rates. The present invention overcomes the foregoing and provides other features and advantages by regulated nonlinear damping for optimal and critical damping in the lower range of traverse rates for tracking and sighting while limiting the resistance to torque to facilitate tracking at faster rates and permitting rapid slewing as often required during target acquisition.

The prior copending application of Howard P. Higginson et al., cited supra, is directed to nonlinear damping of rotational movements about the axes of traversing assemblies of cameras, weapons, and the like to provide a high degree of damping at low rates of traversals to eliminate waver, jitter and overshoot while providing saturation characteristics for rapid slewing at high rates of traversal during target acquisition. In each of the dampers, a highly viscous fluid is disposed in a gap between opposing surfaces of coaxial truncated cones to induce shear stresses and resistance to relative motion. The proximity of these surfaces causes distortion of the fluid and resulting fluid friction therein due to shearing stresses. Suspensions and highly viscous fluids have a complicated response to distortion and the apparent viscosity decreases at higher shear rates which provides for linearly increasing resistance to motion at lower shear rates and limited resistance to motion at higher shear rates for rapid slewing. For example, an organic fluid, dimethyl polysiloxane in the range of approximately 30,000 to 3 million centistokes or higher viscosity, provides the desired linear increase in resistance for optimal or critical damping over the lower range of tracking rates and saturation in resistance to motion at higher rates of traverse. As a result of this saturation, the torque required at higher rates of traverse for rapid slewing is limited whereby the advantage of optimal or critical damping in the lower range of traversal rates is preserved while allowing for rapid slewing as either desirable or necessary for operation. Although this prior damper of the copending application provides many features and advantages over prior art dampers in most applications, in certain instances, the truncated cone or drum type dampers have the disadvantages of substantial break-away friction corresponding to the large diameter seals at each end, large area of sealing, heavier weight of large diameter drums and long time constant for compensation about the small, long gap.

More particularly, in prior weapons systems of the portable missile launcher type having controlled guidance and optical tracking of the target throughout the flight of the missile, undesirable expedients have been employed to avoid the problem encountered in providing substantial damping to eliminate waver and overshoot to maintain the equipment cited directly on the target or other object. The automatic missile guidance system for guiding a missile along the line of sight to a target established by human operator comprises a guidance unit including a radiant energy receiver adapted to receive energy radiated from the missile and forming guidance signals related to the deviation of the missile from the line of sight established by the operator by the optical tracking manually position optical tracker. In U.S. Pat. No. 3,233,847 issued to A. Girsberger on Feb. 8, 1966, which is incorporated by reference herein, a system is disclosed of the aforementioned type and which provides for elimination of trembling movements of the operator as he manipulates the controls. The expedients suggested by this patent was to provide mechanical drag springs, highly viscous fluids or eddy current brake with a highly damping action, or a low-pass filter which could be incorporated in the electrical transmission channel for elimination of signals in the undesired frequency range. As noted therein, this has the undesirable feature of eliminating large and rapid movements of hand controls into corresponding rapid changes in the course of the missile which are often times necessary. In order to provide for rapid changes in the course of the missile, a system of this prior patent discloses switches and circuits for combining signals to provide for rapid changes during certain intervals in the flight of the missile. Accordingly, a compromise has been selected in which only limited control of rapid changes is provided during the missile flight. The response time is so degraded by this arrangement that additional compensation is provided whenever rapid changes in direction are required. Accordingly, direct coupling with the hand controller is provided for introducing the higher frequency components in their entirety in the coupling between driving and driven shafts in an elastic entrainment wherein the movements of the driven shafts are damped. Other embodiments relied on a delay in the introduction of control movements of the hand controls, i.e. only after a time lag by use of drag springs which provide for retarding changes of azimuth in elevation components introduced by the hand controls.

The present invention overcomes the problems encountered in the system disclosed by this patent by providing regulation of traversing movements in which damping eliminates high frequency vibrations including trembling movements or human waver of the operator as he manipulates the controls but due to the apparent decrease in viscosity of the damper at high shear rates provides for rapid movements of the hand controls to provide corresponding rapid changes of the course of the missile. Critical damping for eliminating human trembling or waver is provided while avoiding the difficulties which would otherwise be encountered by linear increasing damping resistance of Newtonian fluids at slew and tracking rates, by nonlinear damping in which limiting of damping resistance is provided by the substantial decrease in viscosity at the high viscosity of the (non-Newtonian) damping fluid to avoid the need for declutching, for example.

In U.S. Pat. No. 2,971,437, issued on Feb. 14, 1961, H. Surtees, a missile guidance system is disclosed in which a tachometer provides acceleration guidance signals for directing a missile in flight. Critical damping of the traversing movements of this system to eliminate human waver as provided by the present invention would overcome difficulties of erratic guidance due to waver of the operator at the controls.

Preferably, a missile guidance system, such as disclosed in U.S. Pat. No. 3,711,046, issued on Jan. 16, 1973, to the common assignee of the present application, is mounted on a traverse unit as disclosed in the present application to regulate the traverse movement during the target alignment. As shown in the latter cited patent, guidance signals are transmitted to the missile by a wire, trailing from the missile and connected to the guidance system.

SUMMARY OF THE INVENTION

The present invention is directed to a viscous fluid damper having damper surfaces disposed in opposing relationship to provide concurrent high and low rates of relative movement of the opposing surfaces and a small gap spacing for opposing surfaces moving at the high rate, for inducing a high rate of shear and high shear stresses in the smaller gap for operating in the range of desired characteristics for the damper. Preferably, the damping fluid is non-Newtonian, exhibiting a nonlinear, substantial apparent decrease in viscosity under high shear stress, particularly in the range of higher viscosities. For example, dimethyl polysiloxane or silicone damping fluid having a viscosity of 100,000 centistokes or more provides a substantial apparent decrease in viscosity under conditions of high shear stress induced at high shear rates above 10.5 sec$^{-1}$ and a gap spacing of 5 mils (0.005 inch).

Inducing non-Newtonian behavior in the damping fluid permits a higher degree of damping or damping resistance at low traverse rates by a high viscosity fluid in an area having a small gap spacing and large radius for high rate of movement of opposing damper surfaces.

In the prior copending application, referenced supra, frustro-conical damper surfaces provide high shear rates by a large mean-diameter of frustro cones. However, this prior structure requires large mean-diameter seals at each end of the frustro cones to contain the damping fluid between opposing damper surfaces thereof. Because the preferred silicone damping fluid tends to "creep" past the seals, relatively high sealing pressure, i.e. tight seals, has been found to be necessary to prevent leakage. While this arrangement is very desirable for many damper applications, the starting or break-away friction of the seals may be either undesirable or an intolerable characteristic for others.

The preferred embodiment of the present invention avoids the large mean-diameter seals, large sealing area and accompanying large break-away friction characteristic by providing integral, small mean-diameter annular sections for the damper surfaces and locating annular seals thereat for small mean-diameter seals having an accompanying small sealing area and break-away friction characteristic. The integral, large mean-diameter annular section of the damper surfaces develop the high rates of relative movement between the sections of the damper surfaces in small gap spacings for high shear rates and high shear stresses. Development of high shear rates is important for utilizing the non-Newtonian characteristic for substantial limiting of force necessary to overcome damping resistance of the damper. In the normal range of operation of the damper, the opposing small mean-diameter annular sections do not develop relative movement at shear rates sufficient to develop any substantial non-Newtonian (nonlinear) characteristic of the damping fluid, i.e. decrease in apparent viscosity for substantial limiting of force or torque at intermediate and high traverse rates. A large gap provided between opposing annular sections of opposing damper surfaces of small mean-diameter minimizes shear stress and accompanying shear resistance of the small annular sections of the damper. Accordingly, a large gap spacing minimizes the linear increase in shear resistance produced by small mean-diameter sections of damper surfaces which are operated at too low shear rates for inducing a substantial apparent decrease in viscosity (non-Newtonian characteristic).

Accordingly, it is an object of the present invention to provide a damper having the foregoing features and advantages.

A further object is the provision of a damper having low break-away friction.

Another object is to provide an improved damper for traverse units.

Still another object is to provide a damper having an improved damping coefficient.

A further object is the provision of a damper of light weight and inexpensive construction.

Other objects and features of the invention will become apparent from the detailed description which follows.

DESCRIPTION OF THE PREFERRED EMBODIMENTS

Figure 1:
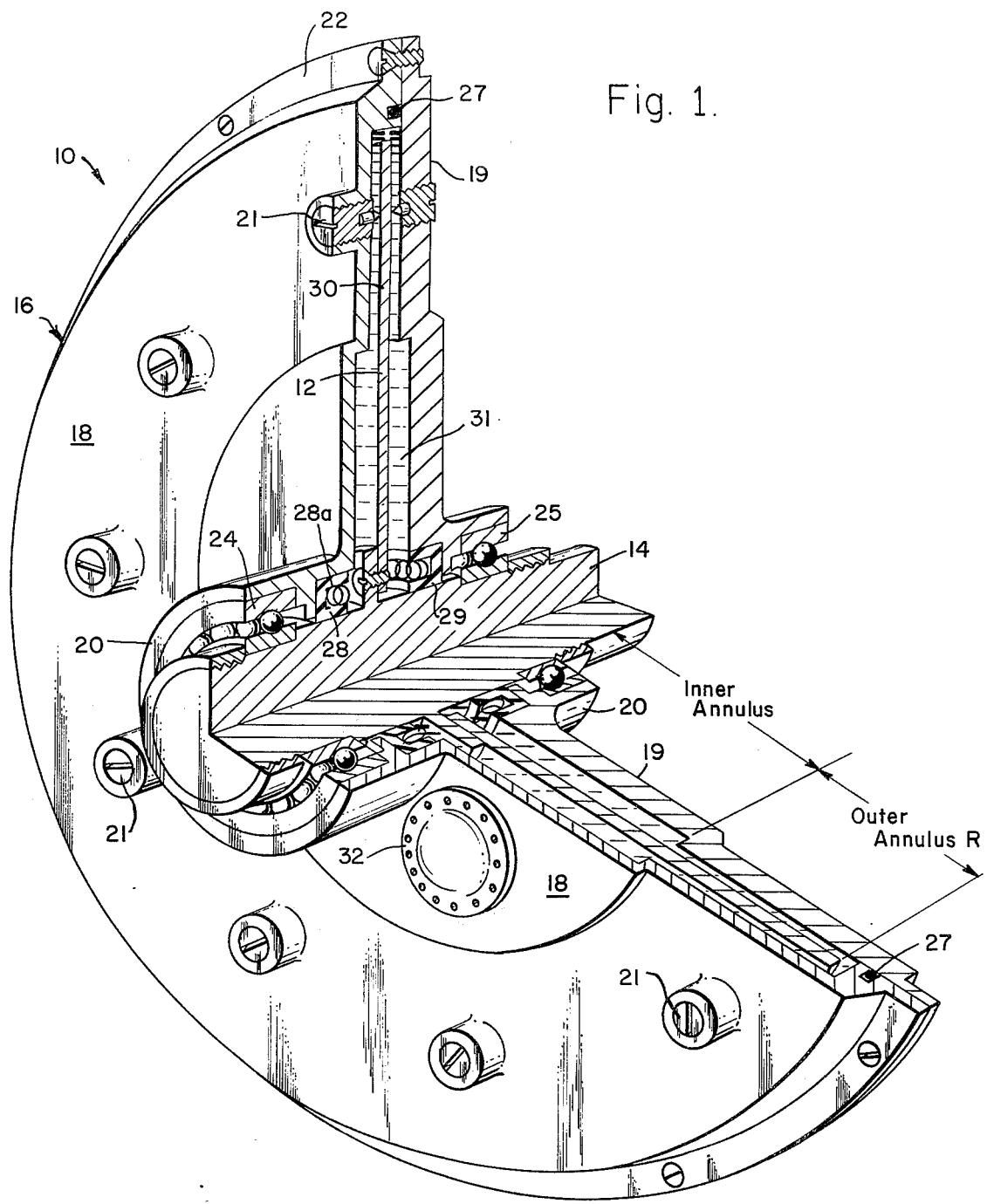
FIG. 1 is a perspective view of the damper of the invention having a section broken away to show the internal structure thereof.

Referring now to the drawings, the damper 10 of the preferred embodiment of invention comprises a thin disc 12 rigidly secured to a shaft 14, and a damper enclosure 16 having side walls 18,19 extending between an inner hub 20 to an outer peripheral flange 22. The disc 12 is supported for rotation relative to the opposing side walls 18,19 by preloaded, duplex bearings 24,25 that are seated and retained as shown in FIG. 1. Threaded plugs or nylon set screws 21 project inwardly from opposite side walls 18,19 at annularly disposed locations to center the disc 12 for equal gap spacings on opposite sides of the disc.

A damping fluid 26 fills the gaps between the disc and the side walls 18,19; and annular seals 28,29 form a dynamic fluid-tight seal providing for relative movement between the hub 20 and shaft 14. Annular seal 27 forms static fluid seal along the peripheral flange 22. The dynamic seals 28,29 include an annular sealing member of polytetrafluoroethylene (PTFE) having a U cross section and an internal helical spring 28a providing sealing pressure to a maximum of 10 psi, for example. The friction torque of the dynamic seals is determined to be low as follows:

$$T = F(D/2)$$

where:
$T = $ torque (ft. lbs.)
$F = $ break-away friction (3 lbs.)
$D = $ seal diameter (1.25 in.), moment arm (D/2)

$$T = 3.75 \text{ in. lbs.} = 0.312 \text{ ft. lbs.}$$

Break-away friction of the constructed damper was somewhat less than 3 lbs. which resulted in less frictional torque for the seals. Average break-away friction including friction of bearings 24,25 averaged (3.61 in. lbs.) 0.30 ft. lbs. An expansion chamber 32 maintains the damping fluid under pressure for preventing voids in the fluid 26 while allowing for fluid expansion over the temperature approximate range of −65° to 160°F.

Figure 4:
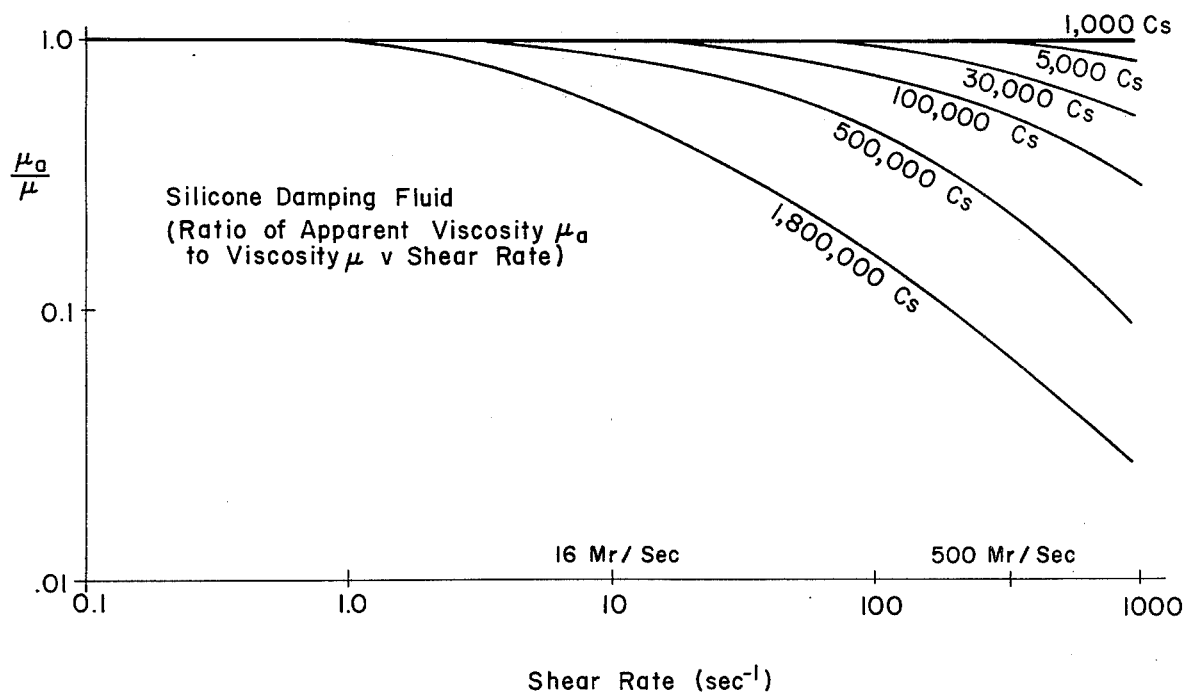
FIG. 4 is a graph showing the nonlinear characteristics of viscous silicone damping fluids of the preferred embodiment of the invention including variations in apparent absolute viscosity as a function of shear rate.

The incremental gap spacing is an important contribution of the present invention in achieving low break-away friction by allowing for locating of the dynamic seals 28,29 at the hub 20 resulting in the small diameter seals, and therefore, minimum opposing contact areas providing fluid-tight seals to the damping fluid 26 in the gaps 30. Further, the incremented gap spacing provides a large-diameter outer annulus R for concurrently producing high shear rates inducing substantial nonlinearity in the high viscosity damping fluid, i.e. the shear rate characteristics of silicone, of high viscosities on the order of approximately 100,000 or more, for example, as shown in FIG. 4. High viscosities include 5 million centistokes, and higher where low temperatures are encountered.

Figure 3:
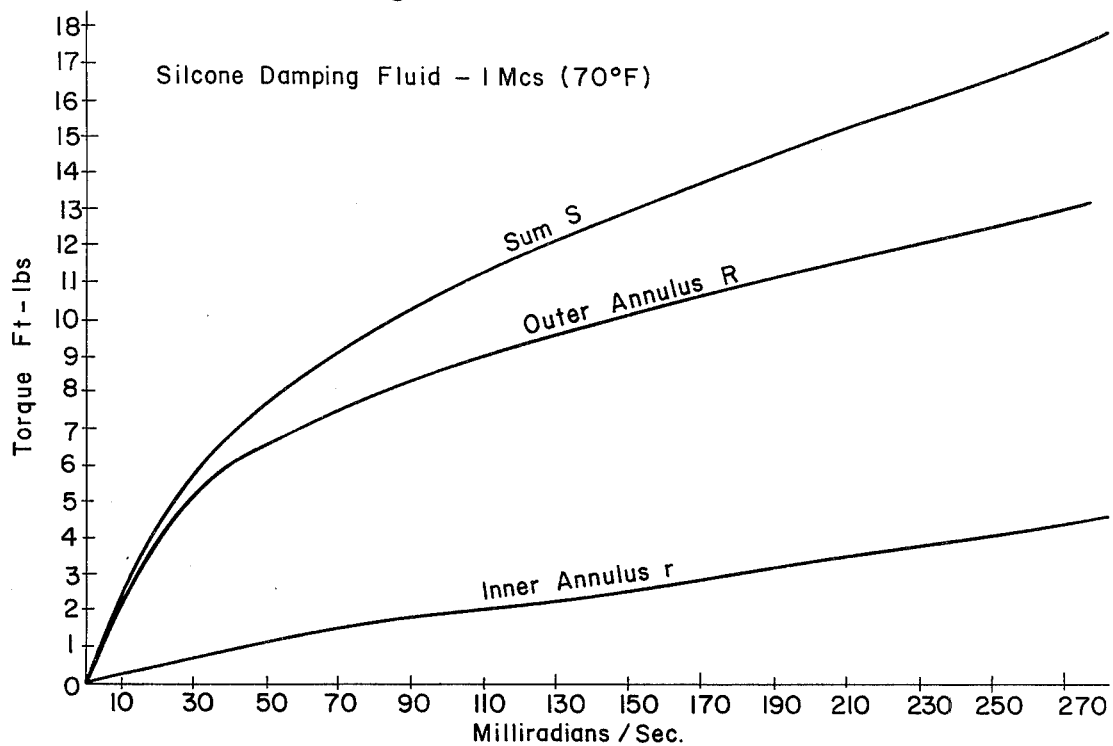
FIG. 3 is a graph showing individual and sum torque v. angular velocity, nonlinear characteristic curves of the damper of the invention.

The individual characteristics of two typical large and small gap spacings for inner annulus r and outer annulus R, respectively, are shown in FIG. 3. These areas have corresponding reference characters in FIG. 1 indicating the two annuli r, R. The damping coefficient of the viscous damper of the preferred embodiment of the invention is directly proportional to the absolute viscosity of the viscous damping fluid and inversely proportional to the gap spacing or working gap between relatively movable damping surfaces. In order to achieve high shear rates for substantial nonlinearity in rotatable units, most of the fluid shearing must be produced at a large radius, i.e. at the outer annulus R having small gap spacings 31.

Concurrently low friction levels are provided by dynamic seals 28 and 29 at the hub having the smallest diameter adjacent the shaft 14. A small damping coefficient due to slower relative movement at the inner annulus r is enhanced by large gap spacings 30. The combination of low rates of relative movement and large gap spacing at the inner annulus r results in a low shear rate and minimal damping resistance, as illustrated in the graph of FIG. 3 by the linear curve identified as inner annulus r. Accordingly the damping resistance of the inner annulus r is minimized to retain the desired substantial nonlinearity of the outer annulus R. This has been accomplished as illustrated by the curve, sum S. The linear increase in damping resistance of the outer annulus R by this small amount minimizes the effect of linearity in the resultant characteristic curve, sum S. Further, the resultant torque characteristic is varied by varying the radius of the inner and outer annuli to produce the desired nonlinear characteristic, sum S, of the damper.

Figure 2:
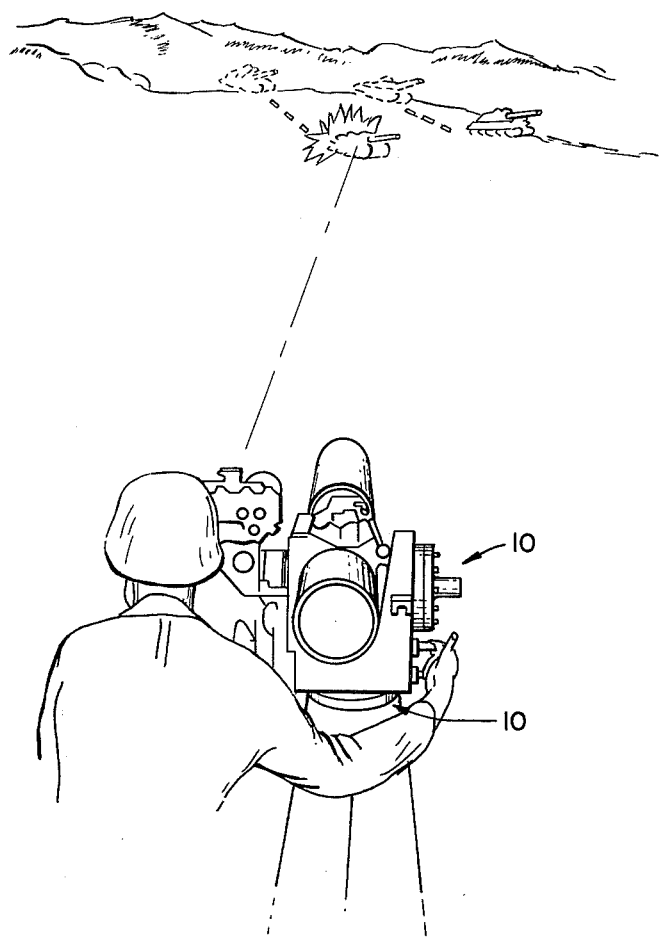
FIG. 2 is a pictorial view of a weapon and guidance system including a traverse unit and sighting equipment for tracking and sighting of a target for guidance of a launched missile to the target.

In accordance with the foregoing discussion, a typical damper having the desired minimum linear damping coefficient has been achieved to provide substantial amount of viscous damping for low tracking rates of the traverse unit in order to provide a force feedback to the operator in proportion to an angular line of sight rate and damping to avoid waver, jitter and overshoot. Concurrently, for moderate to rapid tracking and fast slewing for acquisition, linear increasing damping torques are avoided by nonlinearity, i.e., asymptotic limitation of the damping torque is produced at the higher angular traverse rates. The viscous dampers 10 as shown in FIG. 2, may include identical dampers for elevation and azimuth axis wherein relative movement of the disc and damper enclosure is provided in the elevation damper in which the disc is fixed and the housing is rotated with the traverse unit. In the azimuth axis the enclosure is fixed and the disc is rotated with the traverse unit. A typical damper, according to the present invention, consists of an outer annulus R having 5 mil gap spacings on each side of the disc 12 and an inner annulus r having gap spacings of 150 mils (0.150 inch) on each side of the disc.

In order to maximize damping torque and minimize weight, very small gap spacings with small mean radii-to-gap are desirable for outer annulus R. However, gap spacing substantially below 5 mils is difficult to fabricate because a slight variation in parts becomes a significant percentage of the gap. Accordingly, a large variation would occur in the amount of damping between individual dampers. The alternative to the foregoing is to provide a slightly larger gap spacing and a larger mean radius-to-gap of the outer annulus R.

Temperature compensation in the lightweight damper is limited and is achieved by relying upon the greater nonlinearity of the higher viscosity damping fluids, i.e. a larger decrease in the rate of increase of apparent absolute viscosity with increasing shear rates. Therefore, the torque difference over a specific temperature range and shear rate is less for a damper with a higher viscosity silicone fluid than the damper with a lower viscosity fluid even though the higher nonlinearity is not necessary for limiting the torque at the higher shear rates for moderate to high speed tracking or fast slewing. As noted supra, the minimum diameter dynamic seals 28,29 are located in the hub and the minimum hub diameter is determined to be large enough to permit fastening to a shaft without inducing looseness at the drive when resisting damper torques. For these requirements a hub diameter of 1.25 in. was chosen which resulted in a break-away friction of 0.312 ft. lbs. for the damper.

A high viscosity fluid, e.g., silicone fluid having a viscosity of 1,000,000 centistokes, was selected and the damper dimensions were determined to produce the desired substantial nonlinearity indicated by the curves in the graph of FIG. 3. The typical damper producing the resultant characteristic, sum S, included an outer annulus having maximum radius of 3.00 in. and an inner radius of 2.35 in. The inner annulus extends from the hub to the inner radius of 2.35 in. The gap dimensions are 5 mils (0.005 in.) for the outer annulus and gap spacings of 150 mils (0.150 in.) for the inner annulus.

In light of the above teachings of the preferred embodiments disclosed, various modifications and variations of the present invention are contemplated and will be apparent to those skilled in the art without departing from the spirit and scope of the invention. For example, other configurations other than the flat disc as shown in the preferred embodiment can be provided, particularly where a uniform or constant radius of damping surfaces is desired and takes the form of a drum or drum section including the end walls connected to the shaft at the center thereof.

In the preferred embodiment, as shown, the outside radius allows for a static seal and fasteners, and the damper and disc are formed of aluminum to reduce the weight for portability. The typical damper weighs approximately one pound including the damping fluid. Also, annular PTFE rings seated in the damper surface of the outer annulus may be provided on each side of the disc and substituted for the threaded plugs and spacers 21. The specific structure, while preferable, accomplishes the function of assuring flatness of the thin disc 12 in the damper enclosure 16. In FIG. 2, the bearings 24,25 for the azimuth damper are functional when mounted in a traversing unit in providing support for the lower end of the outer gimbal. The elevation damper however, when installed in the traversing unit, does not provide support on the elevation axis and the heavy load bearings were unnecessary and maintained only for design commonality.

I claim:

1. A fluid damper comprising:
    damper surfaces arranged in opposing relationship and disposed to provide a gap for damping fluid wherein said gap comprises a plurality of different gap spacings between at least two opposing damper surfaces; said damping fluid comprising a fluid of high viscosity having a linearly increasing shear resistance at lower shear stresses and substantial limiting of shear resistance at higher shear stresses and filling said gap; and
    means for supporting the opposing damper surfaces for relative movement to produce different rates of non-turbulent shear concurrently in the damping fluid disposed in the gap over the operating range of said damper including a higher rate of shear in the fluid in the smaller gap spacing for increasing the shear stresses in the smaller gap in order to provide the desired limiting of shear resistance characteristics for the damper.

2. The fluid damper according to claim 1 in which the damper surfaces are annular and at least one of said opposing damper surfaces is supported for rotation to produce said relative movement and shear stresses in the damping fluid.

3. The fluid damper according to claim 2 in which the rates of relative movement of annular sections of said opposing surfaces is different to provide different shear stresses in the damping fluid.

4. The fluid damper according to claim 3 in which the annular section having a lower rate of relative movement for lower shear stresses has a larger gap spacing for further reducing shear stresses in the damping fluid in the larger gap.

5. A fluid damper comprising:
    damper surfaces arranged in opposing relationship and disposed to provide a gap for damping fluid wherein said gap comprises a plurality of different gap spacings between at least two opposing damper surfaces; said damping fluid comprising a fluid of high viscosity having a linearly increasing shear resistance at lower shear stresses and substantial limiting of shear resistance at higher shear stresses and filling said gap;
    means for supporting the opposing damper surfaces for relative movement to produce different rates of shear concurrently in the damping fluid disposed in the gap over the operating range of said damper including a higher rate of shear in the fluid in the smaller gap spacing for increasing the shear stresses in the smaller gap in order to provide the desired limiting of shear resistance characteristics for the damper; and
    said opposing damper surfaces include radially disposed inner and outer pairs of opposing annular sections of smaller and larger radii respectively, and larger and smaller gap spacings respectively, and said means for supporting the damper surfaces for relative movement provides support for rotational movement between the inner opposing annular sections and the outer annular sections are supported for rotational movement by respective inner sections.

6. The fluid damper according to claim 5 in which the support means includes an annular seal having opposing surfaces disposed along the inner peripheries of the pair of inner annular sections for maintaining the damping fluid in the gap between relatively movable opposing damper surfaces.

7. The fluid damper according to claim 5 in which the damping fluid comprises a non-Newtonian fluid having a linear increase in shear resistance of the damping fluid at lower shear rates, between opposing annular sections of the inner pair and within the range of rates of movement in the operation of the damper.

8. The fluid damper according to claim 5 in which the damping fluid comprises a non-Newtonian fluid responsive to upper range of rates of operational movement to produce shear stresses in the damping fluid between the outer pair of annular sections that is nonlinear, decreasing substantially the rate of increase in shear resistance in the upper range of rates.

9. The fluid damper according to claim 1 in which one of said damper surfaces comprises a disc supported for relative rotation by the support means and the support means further includes a seal for retaining the damping fluid and providing for rotational movement between the disc and opposing damper surface near the inner periphery of the disc to minimize opposing and engaging areas of relatively movable seals and breakaway friction thereof.

10. The fluid damper according to claim 9 in which said damping fluid comprises silicone damping fluid having a high viscosity of at least approximately 30,000 centistokes.

11. The fluid damper according to claim 9 in which said damping fluid is dimethyl polysiloxane having a viscosity in the approximate range of fluid viscosities on the order of 3,000 to 5 million centistokes.

12. The method of damping comprising the following steps:
   forming at least one pair of opposing annular damper surfaces to provide incremental gap spacing between the surfaces;
   filling the gap spacing with a highly viscous fluid having a non-linear characteristic of decreasing apparent viscosity at higher shear stresses; and
   disposing the damper surfaces for relative rotational movement to provide inner and outer annuli having relatively large and small gaps, respectively, for producing corresponding non-turbulent shear stresses in the damping fluid in the gap as a function of the gap spacing and rates of movement, respectively including said higher shear stresses in the small gap in the upper operating range of rotational movement to produce limiting of shear resistance in the upper operating range.

13. The method according to claim 12 in which the incremental gap spacings are formed by forming the opposing annular surfaces of a damper enclosure to produce annular sections and disposing a disc, relatively rotatable to the enclosure and between said opposing damper enclosure surfaces.

14. The method according to claim 13 including the additional step of dynamically sealing the enclosure for relative movement along the inner annulus and between surfaces of the disc and damper surfaces of the enclosure.

* * * * *